3,390,066
ELECTROLYTIC HYDRODIMERIZATION OF CERTAIN ALLYL COMPOUNDS

Manuel M. Baizer, St. Louis, Mo., assignor to Monsanto Company, St. Louis, Mo., a corporation of Delaware
No Drawing. Filed Sept. 15, 1964, Ser. No. 396,728
13 Claims. (Cl. 204—72)

The present invention relates to the manufacture of polyfunctional compounds and more particularly provides a process for electrolytically converting certain allylic compounds to reduced coupled compounds.

The present process involves the electrolytic treatment of $\beta,\gamma$-olefinic carboxylates, carboxamides, nitriles, phosphonates, phosphinates, phosphine oxides, sulfones and pyridines to produce a product reductively coupled at the $\beta$-position.

The process is illustrated:

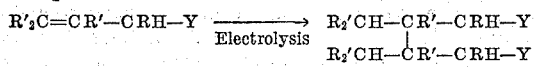

$$R'_2C=CR'-CRH-Y \xrightarrow{\text{Electrolysis}} \begin{array}{c} R_2'CH-CR'-CRH-Y \\ | \\ R_2'CH-CR'-CRH-Y \end{array}$$

in which Y is selected from the group consisting of —CN, —COOR, —CONR$_2$, 2-pyridyl, 4-pyridyl, —PO(OR), —P(O)R(OR), —P(O)R$_2$, and —SO$_2$ hydrocarbyl and the R's are individually selected from the group consisting of hydrocarbyl groups and hydrogen, and the R's are individually selected from the group consisting of hydrocarbyl groups, hydrocarbyloxy groups and hydrogen. In general the hydrocarbyl groups will be hydrocarbyl groups containing no non-benzenoid unsaturation and will contain no elements other than carbon and hydrogen, but the presence of relatively inert substituents which would in no way interfere in the electrolysis is not to be considered precluded, e.g., ether groups are not precluded. The hydrocarbyl and hydrocarbyloxy groups of most interest will contain up to 20 or so carbon atoms, and often only up to 10 or so carbon atoms. The R and R' groups can be such groups, for example, as alkyl, aryl, hydrogen, methyl, ethyl, propyl, isopropyl, butyl, hexyl, phenyl, alpha-naphthyl, beta-naphthyl, 2-ethylphenyl, benzyl, phenylethyl, etc., and R' in addition can be such groups as alkoxyl, ethoxyl, hexoxyl, etc. The pyridyl groups must be such that if the olefinic double bond isomerized to the vinyl position it would be in proper conjugated relationship to the ring unsaturation to permit electrolytic hydrodimerization; that is, the olefinic groups must be substituted on one of the even-numbered carbons of the ring (with respect to the nitrogen atom), e.g., the 2- or 4-carbon atom. 2- and 4-allyl pyridines are suitable, e.g., 2-allylpyridine and 4-allylpyridine. The pyridine rings can of course contain other substituents which do not interfere, e.g., alkyl radicals, particularly lower alkyl radicals such as methyl, ethyl, propyl, isobutyl, pentyl, hexyl, etc., in such pyridyl radicals as 3-methyl-2-pyridyl, 3,6-dimethyl-2-pyridyl, 2-methyl-4-pyridyl, 4-hexyl-2-pyridyl, etc.

The present process utilizes compounds containing an electron-withdrawing group capable of activating an $\alpha,\beta$-olefinic group toward electrolytic hydrodimerization, and also containing an olefinic group in $\beta,\gamma$-position with respect to the electron-withdrawing group. Compounds suitable for use include allyl carboxylates, allylcarboxamides, allyl cyanides, allylphosphonates, allylphosphinates, allylphosphine oxides, allylsulfones and 2- and 4-allyl pyridines, e.g., such compounds as allyl cyanide, methallyl cyanide, crotylacetonitrile, ethyl vinylacetate, methyl crotylacetate, ethyl $\beta$-ethoxy-$\beta$-butenoate, crotylacetamide, 2-vinylacetamide 2-(ethoxyvinyl)acetamide, diethyl allylsuccinate, ethyl $\gamma$-phenyl-$\beta$-butenoate phenyl $\beta$-butenoate, diethyl allylphosphonate, ethyl allylethylphosphinate, allyldiethylphosphine oxide, allyldiphenylphosphine oxide, diethyl-2-hexenylphosphine oxide, allyl methyl sulfone, allyl ethyl sulfone, 2-butenyl methyl sulfone, diphenyl allylphosphonate, ethyl phenyl allylphosphonate, hexyl allylethylphosphinate, phenyl allylmethylphosphinate, ethyl allylphenylphosphinate, diethyl 2-butenylphosphonate, diethyl 3-phenylallylphosphonate, ethyl ethyl-2-butenylphosphinate, diphenyl-2-butenylphospine oxide, diphenyl-3-phenylallylphosphine oxide, phenyl-3-phenylallylsulfone, phenylallylsulfone, etc.

It is to be understood that the present process includes the treatment of mixtures of any two or more of the specified types of allylic compounds or of any two or more of the individual allylic compounds, as well as the individual allylic compounds. When mixtures of the compounds are treated, the products can be reduced, coupled products of two different compounds along with reduced, coupled products of the molecules of the same compounds.

An object of the present invention is the provision of a process for the preparation of di-functional compounds, e.g., the preparation of alkane di-carboxylates, di-nitriles, di-carboxamides, di-phosphonates, di-phosphinates, di-phosphine oxides, di-sulfones and di-pyridyl compounds, cyanoalkane carboxylates, cyanoalkane carboxamides, carbalkoxyalkane phosphonates and pyridylalkane sulfones, and the provision of a process for converting certain allylic compounds to such difunctional compounds.

In general, the electrolytic reductive coupling of the present invention is conducted in concentrated solution in an aqueous electrolyte. It is desirable to employ fairly concentrated solutions in order to minimize undesired reactions of intermediate ions with the water of the electrolyte. The olefinic reactants will ordinarily comprise at least about 10% by weight of the electrolyte, and preferably at least 20% by weight or more. It is generally desirable to employ fairly high concentrations of salts in the electrolyte, for example constituting 5% and usually 30% or more by weight of the total amount of salt and water in the electrolyte, in order to obtain the desired solubility of the olefinic compounds.

As shown in the illustrative formula hereinabove, the coupling occurs at the carbon atom beta to the functional group. It is assumed that prior to the coupling there is an isomerization of the $\beta,\gamma$-double bond to the $\alpha,\beta$-position, and that the electrolytic reductive coupling then occurs by the same mechanism as the hydrodimerization of, for example, crotonitrile, as set forth in my copending application S.N. 333,647, filed Dec. 26, 1963. It is known that various allylic compounds, such as allyl carboxylates, allyl cyanides, allyl carboxamides, etc., are capable of isomerizing under alkaline conditions to the corresponding $\alpha,\beta$-olefinic carboxylates, nitriles and carboxamides. Electrolysis, of course, involves generation of electrons on the cathode and this, in aqueous electrolyte, causes an excess of hydroxyl ion or alkaline conditions in the vicinity of the cathode. It therefore appears that electrolysis causes the in situ isomerization of the allylic reactants to the corresponding vinyl-type compounds and that the latter are reductively coupled at the cathode to form reduced, coupled compounds. While the alkaline conditions for the isomerization step can be caused by the electrolysis, it will be understood that in many cases it will be desirable to provide mildly alkaline conditions by the choice of electrolyte. It will also be understood that the present process is effective in electrolytically converting certain allylic compounds to certain reduced compounds coupled at the $\beta$-carbon, and such is contemplated as the invention regardless of what the course of the reaction may be.

As reductive couplings of like compounds, i.e., hydrodimerizations, are the usual reductive couplings of interest, most of the following discussion will refer specifically to hydrodimerization but it is to be understood that the same principles apply to reductive couplings between two different compounds. Also the term hydrodimerization is used with reference to the starting allylic compounds although they probably isomerize prior to reduction or coupling.

The salt concentration has an important bearing upon the results obtained. When the salts are hydrotropic, high concentrations contribute to solubility of the β,γ-olefinic reactants, making it possible to utilize higher concentrations of the reactants. But beyond this, the concentration of salt cations in some way affects the course of the reaction and results in higher yields of hydrodimers at the expense of simple reduction products. The process of the present invention is carried out utilizing a supporting electrolyte as understood by those in the art, i.e., electrolyte capable of carrying current but not discharging under the electrolysis conditions, but with the requirement that the supporting electrolyte be a salt. As a practical matter the supporting electrolyte salt should constitute at least 5% by weight of the solution electrolyzed. The requirements of supporting electrolytes are well understood by those skilled in the art and they will be able to select such electrolytes and utilize them in the proper concentrations in view of the teaching herein as to catholyte required for hydrodimerizations of α,β-olefinic carboxamides, and salt concentrations essential to such hydrodimerizations. As the hydrodimerization of ethyl vinyl acetate, for example, proceeds at the cathode voltages which can vary from, say, about −2.0 to about −2.1 volts (vs. saturated calomel electrode) depending somewhat upon conditions, any electrolyte salts not subject to substantial discharge at less negative conditions can be employed. Thus, extensive classes of suitable electrolyte salts are available for use. The salts can be organic or inorganic, or mixtures of such, and composed of simple cations and anions or very large complex cations and anions. The term "salts" is employed herein in its generally recognized sense to indicate a compound composed of a cation and an anion, such as produced by reaction of an acid with a base.

It is preferred that the salts employed herein have the properties of that class of salts recognized as "hydrotropic" i.e., as promoting the solubility of organic compounds in water. Various organic sulfonates, alkyl sulfates, etc., have hydrotropic effects. In this application, any salt which increases the solubility of the olefinic reactants in water is considered hydrotropic.

As stated above, it is probable that alkaline conditions cause isomerization of the allylic reactants prior to coupling. Therefore salt solutions are employed in the present invention rather than acid solutions. While the electrolysis in itself generates hydroxyl ions at the cathode, it is preferable that the catholyte in general be non-acidic, or at least that the pH measured in bulk in the catholyte not be much lower than 7. Also, electrolysis at low, especially pH's below about 3, tends to cause polymerization of some olefinic reactants. To minimize polymerization, simple reduction of the olefinic bond and other side reactions the pH is usually maintained in the range from about 7 to about 12 and it is usually preferred that it be no higher than about 9.5 or 10. It will often be desirable, particularly with reactants subject to polymerization to conduct the electrolysis under conditions which inhibit polymerization of the reactants involved or in the presence of a polymerization inhibitor, for example, in an atmosphere containing sufficient oxygen to inhibit the polymerization in question, or in the presence of inhibitors effective for inhibiting free radical polymerization. Classes of inhibitors for inhibiting free radical polymerizations are well known, e.g., such inhibitors as hydroquinone, p-t-butyl catechol, quinone, p-nitrosodimethylaniline, di-t-butyl hydroquinone, 2,5-dihydroxy-1,4-benzoquinone, 1,4-naphthoquinone, chloranil, 9,10-phenanthraquinone, 4-amino-1-naphthol, etc., are suitable. The present process will ordinarily be conducted in the absence of free radical polymerization catalysts or materials which will form polymerization catalysts under the electrolysis conditions, although their presence is not necessarily undesirable if polymerization is sufficiently inhibited or conditions are otherwise such that polymerization will not occur. The inhibitors are ordinarily used in small amounts, e.g., less than 1% by weight based on the olefinic reactant, for example 0.01% by weight based on the olefinic reactant, but can be used in larger amounts such as up to 5% or more by weight, based on the olefinic reactant.

In effecting the reductive coupling of the present invention it is preferred to utilize a cathode having an overvoltage greater than that of copper and to subject to electrolysis in contact with such cathode a concentrated solution of the defined olefinic compounds in an aqueous electrolyte under mildly alkaline conditions. It is understood that both the cathode and the anode will be in actual direct physical contact with electrolyte. In effecting the reductive couplings of the present invention, it is essential to obtain cathode potentials required for such couplings and therefore the salt employed should not contain cations which are discharged at numerically substantially lower, i.e., less negative, cathode potentials. It is desirable that the salt employed have a high degree of water solubility to permit use of very concentrated solutions, for concentrated salt solutions dissolve greater amounts of the organic olefinic compounds.

In addition to the foregoing considerations, number of other factors are important in selecting salts suitable for good results. For example, it is undesirable that the salt cation form an insoluble hydroxide at the operating pH, or that it discharge on the cathode forming an alloy which substantially changes the hydrogen overvoltage and leads to poorer current efficiencies. The salt anion should not be lost by discharge at the anode with possible formation of by-products. If a cell containing a separating membrane is used, it is desirable to avoid types of anions which, in contact with hydrogen ions present in the anolyte chamber, would form isoluble acids and clog the pores of the membrane. Alternatively, the use of an ion exchange membrane effectively separates catholyte and anolyte and the use of different anions in the two chambers may minimize any difficulties a particular anion would cause in one of the chambers.

In general amine and quaternary ammonium salts are suitable for use in the present process. Certain salts of alkali and alkaline earth metals can also be employed to some extent, although they are more subject to interfering discharge at the cathode and the alkaline earth metal salts in general tend to have poor water solubility, making their use inadvisable.

In carrying out the process of this invention, a solution for electrolysis is prepared by adding the olefinic reactant to an aqueous solution (preferably about 30% or more by weight) of the conducting salt to give a solution which ordinarily contains at least 5% by weight, based on the total weight of the solution, of the olefinic reactant in the dissolved state. Depending upon the quantity of salt present and the nature thereof, there may thus be obtained true solutions containing as much as 50% or more by weight of the olefinic reactant. The concentration of olefinic reactant in the dissolved state is to some extent a function of salt concentration; however, at temperatures of above room temperature, i.e., at above, say, 35° C., less of the salt is required to obtain optimum concentration of dissolved olefinic reactant than is required at room temperature. Because the extent of hydrodimerization appears to be related to the concentration of the olefinic reactant in the electrolysis solution, when the electrolysis is to be conducted at room temperature, the olefinic reactant is advantageously added to a saturated aqueous solution of the salt in order to obtain thereby as high a concentration as possible of the dissolved olefinic reactant. When the electrolysis is to be conducted at a temperature of above room temperature, high concentrations of olefinic reactant can be attained with unsaturated solutions of the salt, i.e., the salt may be as low as 30% by weight of the electrolysis solution. Concentration of the olefinic reactant in the electrolysis solution may also be increased by using a mixture of water and a polar solvent, e.g., acetonitrile, dioxane, ethylene glycol, dimethylformamide, dimethylacetamide, ethanol, or isopropanol, together with the aromatic salt.

An electrolytic cell preferably having a cathode of high hydrogen overvoltage is charged with the thus prepared solution and an electric current is passed through the cell to effect the hydrodimerization reaction. Depending upon the concentration of the olefinic reactant and upon the hydrogen ion concentration of the solution, there may or may not be formed products other than the saturated dimer. Thus, when working with concentrations of olefinic reactant which are less than 10% or from 10 to 20% by weight of the solution, there may be formed, in addition to the hydrodimerization product, compounds such as the reduced monomers or other condensation products. With ethyl vinylacetate, for example, ethyl butyrate may thus be obtained as a by-product. The hydrogen ion concentration of the solution will ordinarily be such as to give a pH of 7 or higher, as neutral or mildly alkaline solutions are ordinarily preferred. Many of the olefinic carboxamides tend to polymerize when electrolyzed in strongly acidic solution. Moreover, the hydrogen ion has a cathode discharge potential of about $-1.5$ volts, making it desirable to avoid high concentrations of hydrogen ion in the catholyte if the hydrodimerization occurs at similar or more negative cathode potentials. The hydrodimerization can suitably be conducted at pH's higher than those at which substantial polymerization of olefinic compound occurs, or higher than pH's at which there is undue generation of hydrogen, for example, at pH's higher than those at which more than half the current is expended in discharging hydrogen ions. The pH's referred to are those obtaining in the bulk of the catholyte solution, such as determinable by a pH meter on a sample of the catholyte removed from the cell. The electrolysis in effect separates acid at the anode and base at the cathode; it will be recognized that in an undivided cell the pH in the immediate vicinity of the cathode may differ considerably from that near the anode, particularly if good stirring is not employed. To some extent the effects of acidity can be counteracted by high current density to cause more rapid generation of hydroxyl ions. However, high current densities also require good stirring or turbulence to move the reactants to the cathode.

During electrolysis in a divided cell, alkalinity increases in the catholyte. However, the anolyte becomes acidic. When a porous diaphragm is used to separate the catholyte from the anolyte, the alkalinity of the catholyte will depend upon the rate of diffusion of acid from the anolyte through the porous barrier. Control of alkalinity in the catholyte, when employing a diaphragm, may thus be realized by purposely leaking acid from the anolyte into the catholyte. It can also be achieved, of course, by extraneous addition to the catholyte of an acid material, e.g., glacial acetic acid, phosphoric acid or p-toluenesulfonic acid. Alkalinity may also be controlled, whether or not a diaphragm is used in the cell, by employing buffer systems of cations which will maintain the pH range while not reacting at the reaction conditions.

When a divided cell is employed, it will often be desirable to use an acid as the anolyte, any acid being suitable, particularly dilute mineral acids such as sulfuric or phosphoric acid. Hydrochloric acid can be employed but would have the disadvantage of generating chlorine at the anode, and of being more corrosive with respect to some anode materials. If desired, a salt solution can be used as anolyte, those useful as catholyte also being suitable as anolyte, although there are many other salt solutions suitable for such use. It will be recognized that the descriptions of the catholyte or allylic compound solutions herein apply to the solutions, regardless of whether they are in an undivided cell serving as both catholyte and anolyte, or are in the cathode-containing portion of a divided cell. Conversely, when a divided cell is employed, the various descriptions of the catholyte do not necessarily apply to the anolyte, as the olefinic reactant is not ordinarily present in the anolyte and the character of the anolyte is not of primary importance to the hydrodimerization reaction which is occurring in the catholyte. As a practical matter, to obtain good yields in the operation of a continuous process over a matter of days or weeks, it may be necessary to employ a divided cell to avoid or minimize interfering reactions, such as resulting from generation of hydrogen ions at the anode or resulting in deposition of various salt materials on the anode. Moreover, many suitable catholyte salts are subject to degradation if permitted to contact the anode, making it advantageous to employ mineral acids as the anolyte in a divided cell.

The present process can employ current densities of greater than 10 amperes/square decimeter of cathode surface, and the most suitable densities may be in the range of 15 to 20 to 40 or 50 amperes/square decimeter and higher, even up to 100 or more amperes/square decimeter, and it is further possible to use cells having a large effective electrode area, whether in a single set of electrodes or in a series of electrodes. Thus in commercial practice it is probable that individual cells will draw at least 20 to 30 amperes, most likely more than 100 amperes, and cells drawing more than 1000 amperes are contemplated. For reasons of economics and to make practical use of such current densities without necessitating prohibitively high cell voltages, it is essential to have fairly low resistance in the cell as obtainable by utilizing fairly high concentrations of the electrolyte salt and a relatively narrow gap between the electrodes, e.g., no more than one-half inch, and preferably of the order of one-fourth inch or smaller. Applied voltages of 5 to 20 volts for current densities of 15 to 40 amperes/dm.$^2$ are suitable, and it is preferable, in this range as well as at higher densities that the applied voltage have a numerical value no greater than one-half the numerical value of the current density (in amperes/dm.$^2$). Various power sources are suitable for use in the present invention, particularly any efficient sources of direct current, and, if desired, various known means of varying the applied potential to regulate the current density and the cathode potential can be employed, for example, the means described in Metcalf et al., U.S. Patent No. 2,835,631 issued May 20, 1958, the disclosure of which is incorporated herein by reference. If desired alternating current can be superimposed on the direct current applied to the cell.

Materials suitable for constructing the electrolysis cell employed in the present process are well known to those skilled in the art. The electrodes can be of any suitable cathode and anode material. The anode may be of virtually any conductor, although it will usually be advantageous to employ those that are relatively inert or attacked or corroded only slowly by the electrolytes; suitable anodes are, for example, platinum, carbon, gold, nickel, nickel silicide, Duriron, lead and lead-antimony and lead-copper alloys, and alloys of various of the foregoing and other metals.

Any suitable material can be employed as cathode, various metals and alloys being known to the art. It is generally advantageous to employ metals of fairly high hydrogen overvoltage in order to promote current efficiency and minimize generation of hydrogen during the electrolysis. In general it will be desirable to employ cathodes having overvoltages at least about as great as that of copper, as determined in a 2 N sulfuric acid solution at current density of 1 milliamp/square centimeter (Carman, Chemical Constitution and Properties of Engineering Materials, Edward Arnold and Co., London, 1949, page 290). Suitable electrode materials include, for example, mercury, cadmium, tin, zinc, bismuth, lead, graphite, aluminum, nickel, etc., in general those of higher overvoltage being preferred, although those of lower hydrogen overvoltage can also be employed, even if they cause generation of hydrogen under the electrolysis conditions, as is the case with stainless steel and other electrodes of lower hydrogen overvoltage. It will be realized that overvoltage can vary with the type of surface and prior history of the metal as well as with other factors; therefore the term overvoltage as used herein with respect to copper as a gauge has reference to the overvoltage under the conditions of use in electrolysis.

Among the salts which can be employed according to the invention for obtaining the desired concentration of dissolved olefinic reactant, the amine and quaternary ammonium salts are generally suitable, especially those of sulfonic and alkyl sulfuric acids. Such salts can be the saturated aliphatic amine salts or heterocyclic amine salts, e.g., the mono-, di- or trialkylamine salts, or the mono-, di- or trialkanolamine salts, or the piperidine, pyrrolidine or morpholine salts, e.g., the ethylamine, dimethylamine or triisopropylamine salts of various acids, especially various sulfonic acids. Especially preferred are aliphatic and heterocyclic quaternary ammonium salts, i.e., the tetralkylammonium or the tetraalkanolammonium salts or mixed alkyl alkanol ammonium salts such as the alkyltrialkanolammonium, the dialkyldialkanolammonium, the alkanoltrialkylammonium or the N-heterocyclic N-alkyl ammonium salts of sulfonic or other suitable acids. The saturated aliphatic or heterocyclic quaternary ammonium cations in general have suitably high cathode discharge potentials for use in the present invention and readily form salts having suitably high water solubility with anions suitable for use in the electrolytes employed in the present invention. The saturated, aliphatic or heterocyclic quaternary ammonium salts are therefore in general well adapted to dissolving high amounts of olefinic compounds in their aqueous solutions and to effecting reductive couplings of such olefinic compounds. It is understood, of course, that it is undesirable that the ammonium groups contain any reactive groups which might interfere to some extent with the reductive coupling reaction. In this connection it should be noted that aromatic unsaturation as such does not interfere as benzyl substituted ammonium cations can be employed (as also can aryl sulfonate anions).

Among the anions useful in the electrolytes, the aryl and alkaryl sulfonic acids are especially suitable, for example, salts of the following acids: benzenesulfonic acid, o-, m- or p-toluenesulfonic acid, o-, m- or p-ethylbenzenesulfonic acid, o-, m- or p-cumenesulfonic acid, o-, m- or p-tert-amylbenzenesulfonic acid, o-, m- or p-hexylbenzenesulfonic acid, o-xylene-4-sulfonic acid, p-xylene-2-sulfonic acid, m-xylene-4 or 5 sulfonic acid, mesitylene-2-sulfonic acid, durene-3-sulfonic acid, pentamethylbenzenesulfonic acid, o-dipropylbenzene-4-sulfonic acid, alpha- or beta-naphthalenesulfonic acid, o-, m- or p-biphenylsulfonic acid, and alpha-methyl-beta-naphthalenesulfonic acid. Alkali metal salts are useful in the present invention with certain limitations, and the alkali metal salts of such sulfonic acids can be employed, i.e., the sodium, potassium, lithium, cesium or rubidium salts such as sodium benzenesulfonate, potassium p-toluenesulfonate, lithium o-biphenylsulfonate, rubidium beta-naphthalenesulfonate, cesium p-ethylbenzenesulfonate, sodium o-xylene-3-sulfonate, or potassium pentamethylbenzenesulfonate. The salts of such sulfonic acids may also be the saturated, aliphatic amine or heterocyclic amine salts, e.g., the mono-, di- or trialkylamine salts, or the mono-, di- or trialkanolamine salts, or the piperidine, pyrrolidine, or morpholine salts, e.g., the ethylamine, dimethylamine or triisopropylamine salt of benzenesulfonic acid or of o-, p-, or m-toluenesulfonic acid; the isopropanolamine, dibutanolamine or triethanolamine salt of o-, p- or m-toluenesulfonic acid or of o-, p- or m-biphenylsulfonic acid, the piperidine salt of alpha- or beta-naphthalenesulfonic acid or of the cumenesulfonic acids; the pyrrolidine salt of o-, m- or p-amylbenzenesulfonate; the morpholine salt of benzenesulfonic acid, of o-, m- or p-toluenesulfonic acid, or of alpha- or beta naphthalenesulfonic acid etc. In general, the sulfonates of any of the ammonium cations disclosed generically or specifically herein can be employed in the present invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tetraalkylammonium hydroxide such as tetraethylammonium hydroxide there is obtained tetraethylammonium p-toluenesulfonate, use of which in the presently provided process has been found to give very good results. Other presently useful quaternary ammonium sulfonates are, e.g., tetraethylammonium o-, or m-toluenesulfonate or benzenesulfonate; tetraethylammonium o-, m- or p-cumenesulfonate, or o-, m- or p-ethylbenzenesulfonate, tetramethylammonium benzenesulfonate, or o-, m- or p-toluenesulfonate; N,N-di-methylpiperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alpha-ethyl-beta-naphthalene sulfonate; tetraethanolammonium o-, m- or p-cumenesulfonate or o-, m- or p-toluenesulfonate; tetrabutanolammonium benzenesulfonate or p-xylene-3-sulfonate; tetrapentylammonium o-, m- or p-toluenesulfonate, or o-, m- or p-hexylbenzenesulfonate, tetrapentanolammonium p-cymene-3-sulfonate or benzenesulfonate; methyltriethylammonium o-, m- or p-toluenesulfonate or mesitylene-2 sulfonate; trimethylethylammonium o - xylene - 4 - sulfonate or o-, m- or p-toluenesulfonate; triethylpentylammonium alpha- or beta-naphthalenesulfonate or o-, m- or p-butylbenzenesulfonate, trimethylethanolammonium benzenesulfonate or o-, m- or p-toluenesulfonate; N,N - di - ethylpiperidinium or N-methylpyrrolidinium, o-, m- or p-hexylbenzenesulfonate or o-, m- or p-toluenesulfonate, N,N-di-isopropyl or N,N-di-butylmorpholinium, o-, m- or p-toluenesulfonate or o-, m- or p-biphenylsulfonate, etc.

The tetraalkylammonium salts of the aryl or alkarylsulfonic acids are generally preferred for use as the salt constituents of the electrolysis solution because the electrolyses in the tetraalkylammonium sulfonates are exclusively electrochemical processes. Employing the same concentration of alpha, beta-olefinic compound, the same cathodic voltage, but using the alkali metal sulfonates instead of the tetraalkylammonium sulfonates, yields of hydrodimerization products are lower than those obtained with the tetraalkylammonium sulfonates. This is true even when there is present in the catholyte the high concentration of olefinic compound which can be attained by employing with the alkali metal sulfonate a co-solvent such as dimethylformamide. This is probably because at cathode voltages at which the hydrodimerization takes place, the alkali metal salts are also affected. Particularly when solutions containing the alkali metal sulfonates are stirred, the cathodic voltage necessary for hydrodimerization results also in discharging some alkali metal ions. Owing to the presence of these resulting metals, a chemical path is taken which results also in formation of the saturated monomer, rather than the hydrodimerization product. Whereas, according to the presently provided process, the two competing reactions, i.e., the formation of hydrodimerization products versus formation of saturated monomer, can be manipulated to favor the hydrodimerization, nevertheless, some saturated monomer is formed when the electrolysis solution contains the alkali metal sulfonates rather than the tetraalkylammonium sulfonates, and the yield of hydrodimer is thereby decreased. On the other hand, purely chemical reaction does not take place when the tetraalkylammonium sulfonates are used instead of the alkali metal sulfonates. This is because at cathodic voltages which favor the hydrodimerization reaction, the tetraalkylammonium ion is not discharged.

Some olefinic reactants are hydrodimerized at low negative cathodic voltages, permitting successful results to be obtained with salts of alkali metals. However, in order to insure against interfering reactions it is usually preferred to employ salts of cations which have more strongly negative discharge potentials, e.g., more negative than −2.2 cathodic volts versus the saturated calomel electrode.

Among the ammonium and amine sulfonates useful as electrolytes in the present invention are the alkyl, aralkyl, and heterocyclic amine and ammonium sulfonates, in which ordinarily the individual substituents on the nitrogen atom contain no more than 10 atoms, and usually the amine or ammonium radical contains from 3 to 20 carbon atoms. It will be understood, of course, that di- and poly amines and di- and poly ammonium radicals are operable and included by the terms amine and ammonium. The sulfonate radical can be from aryl, alkyl, alkaryl or aralkyl sulfonic acids of various molecular weights up to for example 20 carbon atoms, and can include one, two or more sulfonate groups. Any of the quaternary ammonium sulfonates disclosed and claimed in my copending application Ser. No. 75,123 filed Dec. 12, 1960, can suitably be employed.

Tetraethylammonium p-toluenesulfonate is particularly valuable as the salt constituent of the electrolysis solution in the presently provided hydrodimerization process. However, I have also found that the tetraethylammonium p-toluenesulfonate as well as the other tetraalkylammoniums, aryl or alkaryl sulfonates herein disclosed are of general utility in electrolytic reduction processes. The present invention thus provides generally an electrolytic reduction process comprising submitting to electrolysis an aqueous solution of a reducible compound and a tetraalkylammonium salt of a sulfonic acid selected from the class consisting of aromatic aliphatic and aliphatic-aromatic sulfonic acids having from 1 to 6 carbon atoms in each alkyl radical and from 6 to 12 carbon atoms in the acid portion of the molecule.

Another especially suitable class of salts for use in the present invention are the alkylsulfate salts such as methosulfate salts, particularly the amine and quaternary ammonium methosulfate salts. Methosulfate salts such as the methyltriethylammonium, tri-n-propylmethylammonium, triamylmethylammonium, tri-n-butylmethylammonium, etc., are very hygroscopic and the tri-n-butylmethylammonium in particular forms very concentrated aqueous solutions which dissolve large amounts of organic materials. In general the amine and ammonium cations suitable for use in the alkylsulfate salts are the same as those for the sulfonates.

Aside from their advantageous properties, suitable methosulfates are readily prepared by reacting ethanolic solutions of dimethylsulfate with trialkyl amines, thereby producing methyltrialkylammonium methosulfates.

Various other cations are suitable for use in the present invention, e.g., tetraalkylphosphonium and trialkyl sulfonium cations, particularly as sulfonate salts formed from sulfonic acids as described above, or as methosulfate salts.

As a further illustration of electrolytes suitable for use in the present invention, the following named salts have all successfully been employed in hydrodimerizations to obtain hydrodimers as the major product with little or no formation of impurities, generally employing concentrated aqueous solutions of the salts containing at least 15% and usually 20 to 40% by weight olefin, and utilizing the general procedures of the illustrative examples herein:

(1) N - trimethyl - N' - trimethylethylenediammonium di-p-toluenesulfonate,
(2) Benzyltrimethylammonium p-toluenesulfonate,
(3) Methyltri-n-butylphosphonium p-toluenesulfonate,
(4) Tetraethylammonium sulfate,
(5) Di-tetraethylammonium benzenephosphonate,
(6) Trimethylsulfonium p-toluenesulfonate,
(7) Methyltri-n-hexylammonium p-toluenesulfonate,
(8) Benzyltrimethylammonium phosphate,
(9) Benzyltrimethylammonium acetate,
(10) Methyltri-n-butylammonium methosulfate,
(11) Benzyltrimethylammonium benzoate,
(12) Tetraethylammonium methanesulfonate,
(13) Benzyltrimethylammonium 2 - naphthalenesulfonate,
(14) Bis-benzyltrimethylammonium m-benzene disulfonate,
(15) Benzyltrimethylammonium thiocyanate,
(16) Tetramethylammonium methosulfate.

Various other quaternary ammonium, tetraalkylphosphonium or trialkylsulfonium salts can be employed in the present process, e.g., the halides, sulfates, phosphates, phosphonates, acetates, and other carboxylic acid salts, benzoates, phosphonates, etc., specifically, for example, tetramethylammonium bromide, tetraethylammonium bromide, tetramethylammonium chloride, tetraalkyl phosphonium chloride, tetraethylammonium phosphate, etc., and similarly the alkali, alkaline earth and other metal salts with the foregoing anions can be employed, e.g., sodium chloride, potassium phosphates, sodium acetate, calcium acetate, lithium benzoate, calcium chloride, rubidium bromide, magnesium chloride, as well as the sulfonic acid, particularly aromatic sulfonic acid, and alkylsulfuric acid salts of the foregoing cations and of other alkali, alkaline earth, rare earth and other metals, e.g., cesium, cerium, lanthanum, yttrium, particularly with anions to achieve sufficient water solubility. The aluminum cation is only somewhat inferior to sodium in respect to its discharge potential, but most salts of aluminum tend to hydrolyze in water and precipitate aluminum oxide. It is understood that the solutions designated herein as containing salts, electrolytes, etc.; in specified amounts have reference to solutions containing salts sufficiently stable to remain in solution. It will be recognized that many cations are capable of existing in several valence states, and some valence states will be more suitable as supporting electrolytes than others. Other examples of salts which can be employed in the present process, although not necessarily with equivalent or optimum results, are barium bromide, barium acetate, barium propionate, barium adipate, cerium sulfate, cesium chloride, cesium benzoate, cesium benzenesulfonate, potassium oxalate, potassium sulfate, potassium ethyl sulfate, lanthanum acetate, lanthanium benzene sulfonate, sodium sulfate, sodium potassium sulfate, strontium acetate, rubidium sulfate, rubidium benzoate, trisodium phosphate, sodium hydrogen phosphate and sodium bicarbonate.

Solubility will to some extent set an upper limit on salt concentration in the electrolyte solution, although if considered on the basis of water solubility in the salt, fairly low concentrations of water can be employed, but in general there will be at least 5% or so by weight of water or other proton donor present to avoid excessive production of higher polymeric materials, and water will generally constitute more than 15 or 20% by weight of the catholyte.

In conducting the electrolysis process batch-wise and on a laboratory scale, the following procedure and apparatus may be employed: The electrolytic cell will comprise a container of material capable of resisting the action of the electrolytes, e.g., glass. Within the container, and serving to divide it into an anode compartment and a cathode compartment may be a diaphragm in the form of a porous cup, e.g., of unglazed porcelain. The anode, which can be of, e.g., platinum or carbon, or any electrode which is inert under the reaction conditions, is immersed in an anolyte contained in the porous cup. The anolyte is an aqueous solution of the salt. When there is employed no diaphragm in the cell, stirring can be employed for pH control. Thereby the anode is subjected to little or no attack; so that the anode can be of substantially any electrode material. An anode comprising lead deposited on a copper screen can thus be employed. The cathode, which may be mercury, lead or another metal, and the porous cup, if one is employed, are submerged in the solution of beta,gamma olefinic reactant in the concentrated aqueous salt or a mixture of the same with a polar solvent. The entire cell may be cooled by a jacket containing a coolant, and both the anode and cathode chambers may be equipped with condensers. However, as will be hereinafter shown, the increase of temperature which is produced during electrolysis generally does not result in so much of a decrease in yield that cooling other than with circulating water is economically required. Generally, the electrolysis can, for example, be conducted at a temperature of from, say, less than about 10° C., and up to almost the refluxing temperature of the electrolytic bath and at higher temperatures under pressure. Actually, slightly higher than ordinary ambient temperatures are conductive to improved yields, higher olefin solubilities and lowered electrical resistance. This is to some extent counterbalanced by the tendency of some diaphragm material such as cationic membranes to deteriorate at elevated temperatures, say of 70° C., or the like and the tendency of some amides to vaporize at higher temperatures. It is generally advantageous to operate in the range of about 40 to about 60° C. Stirring of the solution during the electrolyses, if desired, may be conducted by mechanical or magnetic means. During the electrolysis, the pH of the catholyte may be controlled as hereinbefore described. The quantity of current which is supplied to the cell will vary with the nature and quantity of the bath and of the electrodes and with the operating temperature, but will ordinarily be at a rate greater than 0.5 ampere and in the order of a current density of, say, from 2.0 to 20.0 or 40 or more amperes/dm.$^2$ (dm.$^2$ refers to the area in square decimeters of cathode surface). The efficiency of the process is, to some extent, dependent on the current density used. Thus for the efficient production the current density ordinarily should be at least about 5 amperes/dm.$^2$ and practical production rates ordinarily require the use of much higher current densities.

The process is further illustrated by, but not limited to, the following examples.

Example 1

A catholyte was prepared by mixing 60 grams ethyl vinylacetate, 40 grams tetraethylammonium p-toluenesulfonate, 10 grams water, 50 grams dimethylformamide and charging the solution to an electrolysis cell. The cell was a glass receptacle containing 110 ml. mercury as cathode (about 55 sq. centimeter area cathode). An Alundum cup was suspended to its top edge in the catholyte and provided with a 50% by weight aqueous solution of tetraethylammonium p-toluenesulfonate as anolyte, the Alundum cup serving as a diaphragm to divide the anolyte from the catholyte, and a platinum anode was immersed in the anolyte. Electrolysis was conducted using a source of direct current at a cell voltage of from about 20 to 40 volts at cathode voltages of —2.0 to —2.1 (vs. saturated calomel electrode) at a current of about one ampere for four hours and then at about two amperes for a total of about seven ampere hours (the current density thus varying from about 1.8 to 3.6 amperes/dm.$^2$ of cathode surface). The catholyte was separated from the mercury, diluted with about 200 ml. methylene dichloride and washed with 400 ml. of water. The aqueous washings were extracted with 200 ml. methylene dichloride and the extract combined with the product which was again washed with water and dried over sodium sulfate. The methylene dichloride was distilled off and the residue distilled through a column with 23.4 grams of diethyl 3,4-dimethyladipate being obtained at 99–100° C./1.4 mm., $n_D^{25}$ 1.4330. Based upon the 0.526 mole of starting material and amperage sufficient to convert half of it to hydrodimer, 31.5 grams would be the theoretical yield, making the actual yield based on current 74.3% of the theoretical yield. An additional product identified as the corresponding hydrotrimer of ethyl crotonate was obtained at 133–135° C./0.1 mm. $n_D^{25}$ 1.4585 in an amount of four grams with analysis corresponding fairly close to that for the hydrotrimer.

Analysis.—Calc'd for $C_{18}H_{32}O_6$: C, 62.76; H, 9.37; M.W. 344.44. Found: C, 62.78; H, 9.9; M.W. 329.

Example 2

An electrolysis of allyl cyanide was conducted employing the electrolysis cell of Example 1. The catholyte included 90 grams allyl cyanide dissolved in 75 grams of a 78.8% by weight solution of tetraethylammonium p-toluenesulfonate in water. The anolyte was 10 ml. of the salt solution diluted with 10 ml. water. The catholyte was neutral in pH at the start of electrolysis, and about 3 ml. acetic acid was added during the electrolysis to control alkalinity resulting from the electrolysis. The electrolysis was conducted at —2 to —2.1 cathode volts (vs. saturated calomel electrode) at a current of 2.5 to 3 amperes for a total of 15 ampere-hours. The catholyte appeared completely homogeneous. The catholyte was diluted with water and separated from the cathode, washed with methylene chloride and dried over sodium sulfate. The methylene chloride was removed on a water bath, and the residue fractionated by distillation through a column. Allyl cyanide, 61 grams, was recovered at 115–118° C., at atmospheric pressure. The remaining material was product which distilled at 142–143° C./4.8 mm., $n_D^{24}$ 1.4500, and had an infra red spectrum virtually identical to that of 3,4-dimethyladiponitrile obtained by hydrodimerization of crotonitrile.

The present applicant has in a number of copending applications disclosed and described the hydrodimerization and cross-coupling reactions of a number of olefinic compounds which are isomeric to those presently employed and reference is made to such copending application both for the types and examples of suitable reactant compounds (it only being necessary to change the α,β-olefinic compounds to the corresponding β,γ-olefinic compounds for use herein), and for a further discussion of reaction conditions and media; such copending applications include S.N. 163,028 filed Dec. 29, 1961 and now Patent No. 3,193,476, S.N. 216,304 filed Aug. 13, 1962 and now Patent No. 3,193,475, S.N. 216,305 filed Aug. 13, 1962 and now Patent No. 3,193,478, S.N. 255,221 filed Jan. 31, 1963 and now Patent No. 3,249,521, S. N. 288,621 filed June 18, 1963 and now Patent No. 3,218,246, S.N. 333,647 filed Dec. 26, 1963 and now Patent No. 3,193,481, S.N. 337,540 filed Jan. 14, 1964 and now Patent No. 3,193,482 and S.N. 337,546 filed Jan. 14, 1964 and now Patent No. 3,193,483. The details of the procedures for the various representative olefinic reactants disclosed herein, are essentially those described herein and illustrated in the above illustrative examples. However, in view of the fact that the presently utilized reactants apparent go through intermediate compounds of the various types for which specific electrolyses are specifically illustrated in the referred to copending applications, reference is made to the copending applications for further illustrations.

The process of this invention is particularly useful in those instances in which the di-functional alkanes have been obtainable only with difficulty or not at all by other processes. By the present process it is often easier to obtain a branched paraffinic di-nitrile, dicarboxylate or di-amide more easily and economically than would otherwise be possible. The di-functional compounds are useful in the preparation of condensation resins by reaction with di-hydroxy or di-carboxylic acid compounds. The di-nitriles can also be readily hydrogenated to di-amines for reaction with di-carboxylic acids to form polyamides. The di-functional compounds are also useful as plasticizers for synthetic resins and plastics.

What is claimed is:

1. A method of electrolysis which comprises subjecting a solution in aqueous salt electrolyte of olefinic compounds selected from the group consisting of $\beta,\gamma$-olefinic carboxylates, carboxamides, nitriles, phosphonates, phosphinates, phosphine oxides, sulfones, 2-pyridines, 4-pyridines and mixtures thereof in which the olefinic group has at least one hydrogen atom attached to the $\alpha$-carbon atom to electrolysis by passing an electric current through said solution in actual physical contact with a cathode, causing development of the cathode potential required to effect reductive coupling, and recovering product consistent with that resulting from coupling of two molecules of starting reactant at the $\beta$-position with saturation of the olefinic groups.

2. The method of claim 1 in which two molecules of the same compound are reacted to obtain a product having twice the carbon atoms of the starting compound.

3. The method of claim 1 in which the solution comprises water, more 5% by weight of olefinic compounds and at least 5% of supporting electrolyte salt.

4. The method of claim 2 in which the pH in the bulk of the solution is maintained above about 7.

5. The method of claim 1 in which the salt provides a cation discharging at cathode potentials substantially more negative than that at which the reductive coupling is effected.

6. The method of claim 1 in which the salt is selected from the group consisting of quaternary ammonium aromatic sulfonates and quaternary ammonium alkyl sulfates.

7. The method of claim 1 in which $\beta,\gamma$-olefinic nitrile is employed as olefinic compound.

8. The method of claim 1 in which allyl cyanide is employed as olefinic compound.

9. The method of claim 1 in which $\beta,\gamma$-olefinic carboxylate is employed as olefinic compound.

10. The method of claim 1 in which ethyl vinylacetate is employed as olefinic compound.

11. The method of electrolysis which comprises subjecting a solution in aqueous salt electrolyte of olefinic compounds selected from the group consisting of $\beta,\gamma$-olefinic carboxylates, carboxamides, nitriles, phosphonates, phosphinates, phosphine oxides, sulfones, 2-pyridines, 4-pyridines and mixtures thereof in which the olefinic group has at least one hydrogen atom attached to the $\alpha$-carbon atom to electrolysis by passing an electric current through said solution in actual physical contact with a cathode having an overvoltage greater than that of copper, causing development of the cathode potential required to effect reductive coupling, the solution comprising water, an amount of supporting electrolyte salt above about 30% by weight of the total amount of water and salt present, more than 10% by weight of olefinic compound and being maintained at a pH of at least 7, and recovering product consistent with that resulting from coupling of two molecules of starting material at the $\beta$-position with saturation of olefinic groups.

12. The method of claim 11 in which the supporting salt is selected from the group consisting of quaternary ammonium aromatic sulfonates and quaternary ammonium alkyl sulfates.

13. The method of claim 1 in which there is further reaction with starting reactant product recovered results from addition of three molecules of starting reactant.

References Cited

UNITED STATES PATENTS

| | | | |
|---|---|---|---|
| 2,632,729 | 3/1953 | Woodman | 204—72 |
| 2,632,761 | 3/1953 | Cheney | 260—290 |
| 2,726,204 | 12/1955 | Park et al. | 204—72 |

HOWARD S. WILLIAMS, *Primary Examiner.*

H. M. FLOURNOY, *Assistant Examiner.*